United States Patent [19]
Geul

[11] 3,732,492
[45] May 8, 1973

[54] ELECTRIC FUEL INJECTION TESTER

[75] Inventor: Herman Robert Geul, Leiden, Netherlands

[73] Assignee: Sun Electric Corporation, Chicago, Ill.

[22] Filed: Sept. 3, 1970

[21] Appl. No.: 69,284

[52] U.S. Cl. ............................ 324/103 P, 73/119 A
[51] Int. Cl. ........................................... G01r 19/16
[58] Field of Search ............. 324/103 P, 103 R, 324/115; 328/35; 307/261; 329/106; 73/119 A, 119 R

[56] References Cited

UNITED STATES PATENTS

| 3,344,663 | 10/1967 | Dreisin et al. | 73/119 A |
|---|---|---|---|
| 3,230,400 | 1/1966 | Blue | 328/35 X |
| 2,924,769 | 2/1960 | Harriman et al. | 324/103 P |
| 2,564,829 | 8/1951 | Bedford et al. | 324/103 R |
| 3,052,844 | 9/1962 | Varterasian | 324/115 X |

Primary Examiner—Rudolph V. Rolinec
Assistant Examiner—Ernest F. Karlsen
Attorney—Molinare, Allegretti, Newitt & Witcoff

[57] ABSTRACT

This invention relates to a device for measuring the varying time duration of opening of electronically controlled injection valves of fuel injection systems for internal combustion engines under actual running conditions. To this end, the electrical square wave pulses which control the opening of the valves are converted into sawtooth pulses with a peak amplitude which is proportional to the width of the control pulses, and thus with the duration of opening of the injection valves. This amplitude of the sawtooth pulses is measured and the resulting output signal is supplied to an indicating instrument of which the scale is marked in time units.

2 Claims, 2 Drawing Figures

ELECTRIC FUEL INJECTION TESTER

BACKGROUND OF THE INVENTION

This invention relates to a device for determining the variable time duration of a repetitive phenomenon with variable frequency occurring in the electrical system of a motor vehicle and particularly for measuring the duration of opening of the injection valves of an electronically controlled fuel injection system for a combustion engine.

The measurement of the duration of opening of the injection valves of an electronically controlled fuel injection system is a problem for which until now no solution has been found which can be used satisfactorily in the workshop. It is known that modern electronically controlled fuel injection systems are checked by taking a number of static measurements. With the system inoperative, one determines whether the resistance of the various senders and feelers which supply the control signals for the electronic control system, have the nominal values. It is further possible to measure voltages and currents in the control circuit itself, but these measurements do not give information about the factual duration of opening of the valves during operation. This duration of opening depends, as is known, on many factors and is controlled by the electronic control circuit in dependence on the engine speed, the load and a number of other factors. The duration of opening can range from 1 to 10 and more milliseconds.

Since the fuel valves are electrically controlled, it is evident that the waveform of the control impulses can be made visible on the screen of a cathode ray oscilloscope. By using a calibrated time base, it is possible to derive from the width of the impulse appearing on the screen the duration of the impulse and thus the duration of opening. Since the measurement of the duration of opening is an absolute measurement which, in order to get a clear idea about the operation of the injection system, should be executed with rather great exactitude, the use of a cathode ray oscilloscope is effective only when an exactly calibrated and therefore expensive oscilloscope is used, with the possibility to take measurements from the screen. In order to obtain a reasonably readable image, this oscilloscope should have a large screen, which is comparatively expensive. Measurements by means of a cathode ray oscilloscope can only be taken by a skilled operator and the use of the oscilloscope for taking measurements requires a degree of care which is not found in the average workshop.

SUMMARY OF THE INVENTION

It is an object of the invention to provide a device of the aforementioned kind with which it is possible to read the variable duration of opening of the valves directly and with great exactness from a dial instrument and for the use of which no skill above normal is required. In fact, it is an object of the invention to provide such a device, the operation of which requires only that the user simply establishes some connection with the element control circuit.

The device according to the invention is characterized by a circuit for converting electric impulses, representing the phenomenon, into sawtooth pulses with an amplitude which increases gradually from the initial value, the peak value of the impulses being representative of the duration of the pulses to be measured, which sawtooth impulses are transmitted to a circuit which determines and indicates, on a dial instrument, the peak value of the sawtooth pulses.

The conversion of electrical pulses with variable pulse width into sawtooth pulses with a peak value which is representative of the input pulses is possible by electronic means, as is the exact measurement of the resulting peak value. Technically, it is possible to construct the device according to the invention in such a way that a very rigid but nevertheless exact measuring apparatus is obtained which can be manufactured at an acceptable price.

In a preferred embodiment, the circuit for measuring the peak value consists of a common detecting circuit with two diodes and two capacitors, the voltage across the output capacitor, which is shunted by a resistor, being representative of the peak value of the sawtooth pulses and therewith of the duration, which is to be determined, of the input pulses.

The repetition frequency of the pulses representing the duration of opening of the injection apparatus is dependent on the engine speed at which the measurement is taken. This repetitive frequency ranges from about 200 milliseconds at idle engine speed to about 20 milliseconds at the maximum engine speed. In order to obtain at the lowest engine speed a sufficiently exact indication on the dial instrument (the needle will adjust itself to the mean value, which at a small time constant and consequently great ripple voltage, is going to deviate from the peak value) the detection circuit should have a rather great time constant which results in that, without special measures, the dial instrument can only respond slowly to a sudden decrease of the pulse duration. Such a situation arises, e.g., when at a certain engine speed, the throttle is suddenly closed. In order to prevent pollution of the air, it is usual in the modern electronically controlled fuel injection systems, when at a particular engine speed, e.g., over 1800 revolutions/minute, the throttle is suddenly closed to interrupt entirely the supply of fuel by a suitable control of the fuel injection system and to release the fuel supply only again when the engine speed has fallen off to, e.g., under 1200 rev./min. In connection with the severe requirements imposed or to be imposed (in relation to the air pollution) on the proper functioning of the fuel injection system, it is particularly desirable that such a fast decrease of the duration of opening of the injection valves can be exactly read from the dial instrument.

In order to render this possible, the sawtooth pulses are supplied to a second peak detecting circuit having a R.C. time constant which is considerably smaller than that of the first detecting circuit, while the output voltage of the first detecting circuit and the output voltage of the second detecting circuit are both supplied to a voltage comparing circuit, which, when the output voltage of the second detecting circuit drops below same of the first detecting circuit (minus a certain threshold value) controls a switching circuit by means of which an impedance of a low value is connected into parallel to the output resistance of the first detecting circuit.

Due to these features a sudden decrease of the duration of opening of the fuel valves results into a fast discharge of the capacitors of the first detecting circuit and, as a consequence this circuit is immediately in a condition to supply a voltage which is representative for the new situation.

The voltage comparing circuit consists preferably of a comparing circuit with two active elements in which circuit, due to capacitive coupling, a closed loop gain above unity can be obtained and to which, at the two control inputs, the output voltages of the two detection circuits are supplied and which is dimensioned in such a way that, when the amplitude of the one output voltage becomes smaller than that of the other voltage — minus a certain threshold value — the circuit changes its state very fast and emits a control pulse to an active element, which is biased non-conductive in its quiescent condition and shunts the load resistance of the first detection circuit, and which now becomes conductive so that the voltage over the resistor and supplied to the comparing circuit decreases very fast, and this circuit returns to its initial state.

BRIEF DESCRIPTION OF THE DRAWINGS

The invention is clarified with reference to the accompanying figures. In the drawing.

DETAILED DESCRIPTION OF THE PREFERRED EMBODIMENT

Figure 1:
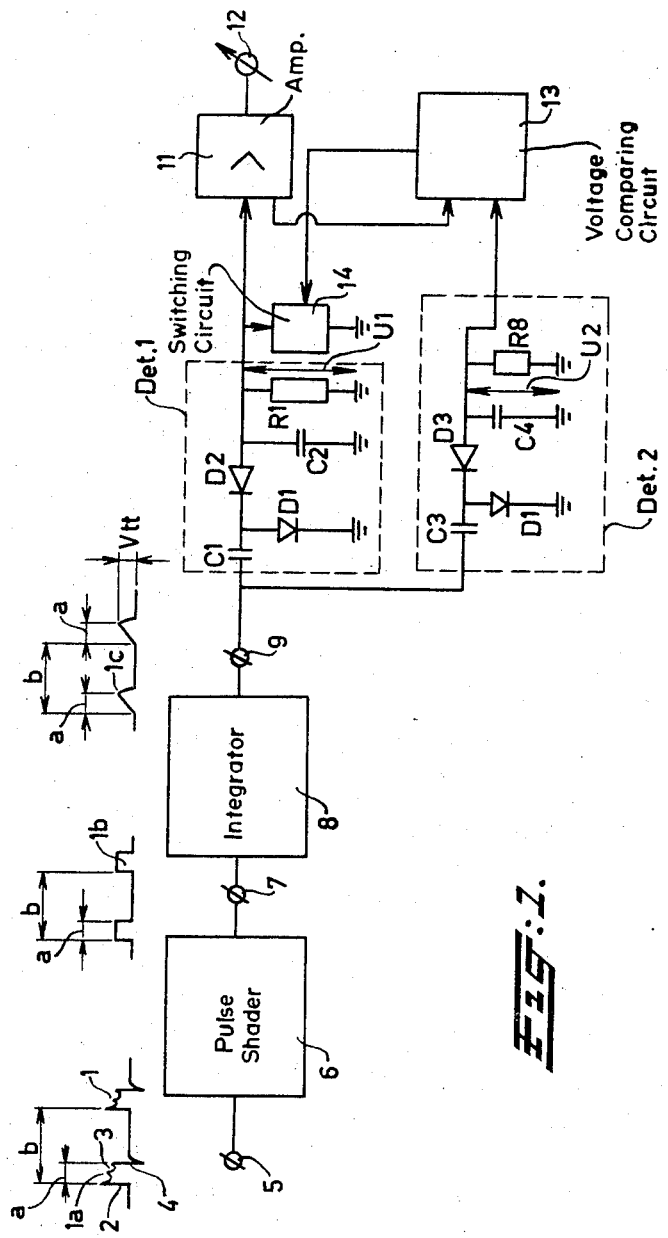
FIG. 1 is a circuit diagram of a preferred illustrative embodiment according to the invention, partly schematic.

Electric pulses are supplied to the input 5 of the device. These pulses have both a variable pulse width and a variable repetition frequency; they are representative of the duration of opening of the electromagnetically operated injection valves of the fuel injection system, to be tested, of a combustion engine. These impulses, denoted in FIG. 1 by the reference numeral 1a, are in this example the controlling voltages for the electromagnetic valves. They have a steep leading edge 2, a slightly falling-off upper part 3, and a negative-going rear edge 4. Both the repetition time $b$, which depends on the engine speed, and the pulse width $a$, which is representative for the duration of opening of the valves, may vary as a function of many variable magnitudes, like the position of the throttle, the load of the motor, the temperature of the motor, and so on. The pulse width may, e.g., vary from 0 to about 10 milliseconds, while the repetition time may vary from 200 milliseconds at idle speed to about 20 milliseconds at maximum engine speed.

These pulses 1a are supplied to the input 5 of a pulse shaper 6 which at its output 7 provides the pulses 1b. The pulses 1a are now converted into pure square pulses 1b with a pulse width $a$ which is equal to that of the original pulses 1a and a repetition time $b$ which is likewise equal to that of the original pulses 1a.

The pulses 1b are subsequently supplied to a pulse converter or integrator 8 in which the pulses 1b are converted into sawtooth pulses 1c appearing at the output 9 with an equal repetition time $b$ and with a gradually increasing leading edge, the width of which being equal to the pulse width of pulse $a$. The peak value $V_{tt}$ of these impulses 1c is, however, proportional to the pulse width of the pulses 1b and consequently of the pulses 1a. A measurement of the peak value of these pulses therefore results in a signal which is directly representative for the pulse width of the original pulses.

This peak value is measured in a detecting circuit Det. 1 with the capacitors C1 and C2 and the diodes D1 and D2. Such a detecting circuit operates in a manner known per se and therefore need not be discussed. A voltage U1, equal to the peak value of the amplitude of the pulses 1c, appears over the resistance R1. This voltage is supplied to an amplifier 11 and is indicated by the dial instrument 12 which is calibrated in "time units".

As said, the repetition time of the pulses 1a may vary from about 200 milliseconds (idle speed) to e.g., about 20 milliseconds (maximum engine speed). In order to ensure that also at the lowest pulse repetition frequency, the measuring instrument 12 gives an exact indication, it is necessary that the detecting circuit C1, C2, D1, D2, R1 has a rather great R. C. time constant, which, by a right selection of the circuit elements, is naturally possible to realize. Without extra measures, however, the dial instrument 12 cannot follow a sudden decrease of the pulse duration. It is, however, very desirable when such a sudden decrease can be observed and measured. To prevent air pollution, the modern fuel injection systems have the provision that, when at an engine speed above 1800 rev./min. the throttle is suddenly closed, the fuel supply is cutoff entirely by means of a suitable control of the fuel injection system, and is only released again when the engine speed has fallen-off to, e.g., under 1200 rev./min. The measuring apparatus greatly improves in practical value when this sudden decrease of the pulse duration which must occur when the fuel injection system functions correctly, is exactly indicated by the dial instrument 12.

In order to make this possible, the device according to the invention comprises a second detecting circuit Det. 2 with the capacitors C3, C4, the diodes D3, D4 and the resistor R8. The capacitor C3 is connected to the point 9 and receives the same pulses as the first detection circuit Det. 1. The voltage U2 appearing across the resistor R8 will be, at a constant engine speed, equal to the voltage U1 across the resistor R1. The time constant of the second detecting circuit is, however, considerably smaller, e.g., ten times smaller, than that of the first detecting circuit so that at a sudden decrease of the pulse repetition frequency the voltage U1, due to the great time constant of the first detection circuit, initially remains almost constant, while the voltage U2 decreases very fast.

The voltages U1 and U2 are now supplied to a voltage comparing circuit 13. When this circuit detects that the voltage U2 falls off below the voltage U1 minus a certain threshold value, a trigger signal is sent to a switching circuit 14 which is connected across the resistance R1 and which, if not triggered, has a very high impedance and thereby does not influence the first detecting circuit Det. 1. If the switching circuit 14 is, however, triggered by the comparing circuit, the impedance of this circuit 14 decreases immediately and the circuit 14 is, in fact, a short circuit for the capacitor C2. The capacitor C2 discharges rapidly; the voltage U1 decreases rapidly and will almost become zero, which condition is detected by the comparing circuit 13. As a result, the switching circuit 14 returns to the condition of rest and the detecting circuit Det. 1 functions again in its normal way. The voltage U1 can now again reach the value corresponding to the new pulse duration and thus the dial instrument 12 indicates again normally the pulse duration of the pulses applied to the input 5. This whole process proceeds within the usual damping time of a measuring instrument, so that in the aforementioned case of a sudden sharp decrease of the pulse duration nevertheless a correct indication will be obtained.

Figure 2:
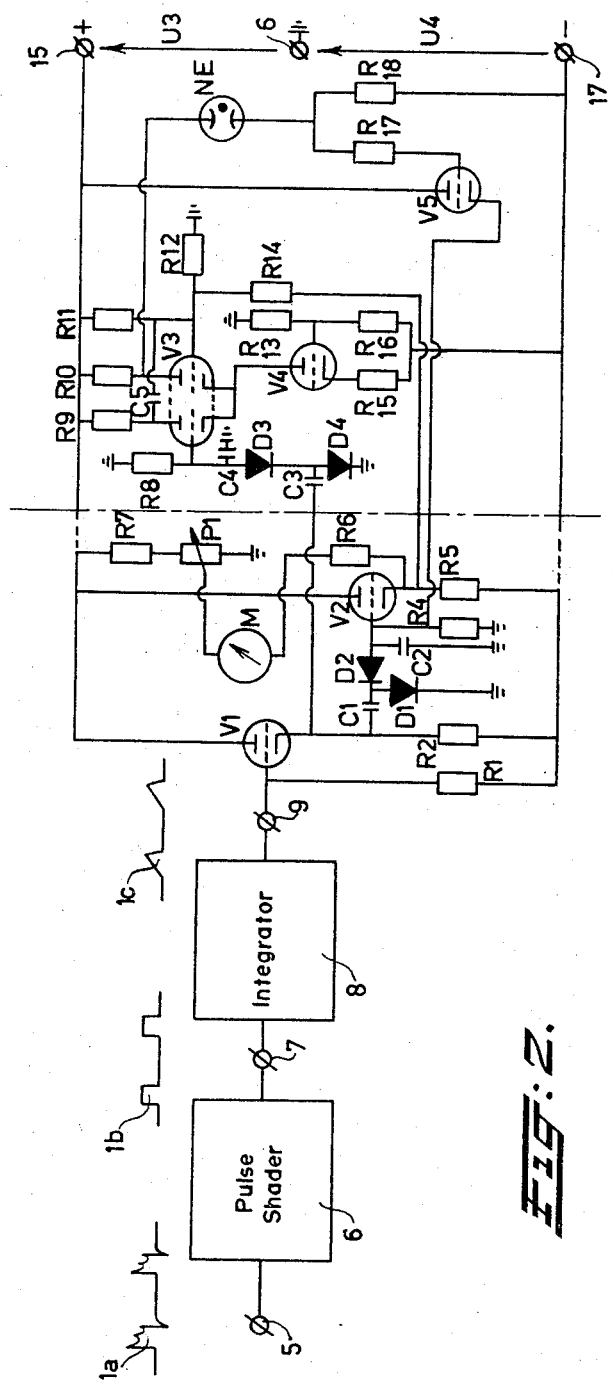
FIG. 2 shows the circuit of FIG. 1 in a greater circuit detail.

FIG. 2 shows one specific circuit arrangement for the detecting circuits Det. 1 and Det. 2, the amplifier 11, the comparing circuit 13 and the switching circuit 14. It should be noted that this circuit has vacuum tubes and is supplied with two voltages with respect to ground; the supply is such that the voltage U3 the point 15 is positive with respect to ground and the supply voltage U4 the point 17 is negative with respect to ground.

The circuit operates as follows:

The sawtooth pulses 1c, present on the point 9, are supplied to the control grid of the valve V1.

When a pulse train of sawtooth pulses is supplied to the input 9, this sawtooth voltage will also be present, with the same shape and amplitude, on the cathode of the valve V1 which acts as a cathode follower. The peak value is, as already said, proportional to the duration of the positive pulses of the pulse train and independent of the repetition frequency.

The sawtooth voltage present on the cathode is converted into a D.C. voltage, which is likewise proportional with the duration of the pulses mentioned already, by means of the peak detecting circuit, constituted by the diodes D1 and D2 and the capacitors C1 and C2. This D.C. voltage can be measured by means of the moving coil instrument M through the cathode follower circuit, constituted by the triode V2 and R4 and of the network R6, P1 and R7.

The resistance R4 determines together with the values of the capacitors C1 and C2 the discharge time of these capacitors. This discharge time should at any rate be so great that at the lowest repetition frequency of the positive pulses on the input 5, the average ripple amplitude of the rectified voltage does not exceed the permitted measuring fault.

When the repetition frequency is low, the discharge time must be long which has the drawback that, if the width of pulse to be measured decreases fast, the measuring system cannot follow this fast change and as a consequence lags behind.

In order to overcome this problem, the circuit is completed by the part to the right of the dash-dot line, corresponding with the blocks Det. 2, 13 and 14 in FIG. 1.

The cathode of the valve VI feeds a second peak detecting circuit, constituted by the diodes D3 and the capacitors C3 and C4. The values of the discharge resistor R8 and the capacitors C3 and C4 are choosen in such a way that the discharge time of this system is considerably, e.g., a factor 10, smaller than the discharge time determined by C1, C2 and R4.

The rectified voltage obtained across the resistance R8 is supplied to the left section of the double triode V3 which together with V4 and the resistors R9, R10, R11, R12, R13, R15, R16 and the capacitor C5 constitutes a voltage comparing circuit with capacitive positive feed back.

The grid of the right section of the double triode V3 is connected via R4 to the cathode of the triode V2. The circuit is dimensioned in such a way, that, if there is no AC voltage, or an AC voltage with constant amplitude, on the cathode of the valve VI, then the right triode section of the valve V3 is always conductive and the left triode section is cut off.

The anode voltage of the right triode section of V3 is then relatively low. Via the voltage divider, constituted by the neon valve NE and R18, this voltage is reduced to a negative value with respect to ground, and of such an order that this voltage is significantly more negative than the maximal possible voltage on the grid of V2 when this valve is completely driven, a situation which occurs in case of a maximal duration of injection with consequently a maximal peak value of the sawtooth pulses.

The grid of V2 is connected with the cathode of the triode V5, but since the grid potential of V5 in the static condition is always significantly more negative than the cathode potential of V5, as explained hereinbefore, this triode is cut off and will therefore not influence the discharge time of the combination C1, C2 and R4.

If the pulse duration varies then there is no change in the above situation described when the pulse duration increases since the charging time for the two detecting systems is almost identical and the two voltages increase equally fast.

When the pulse duration is reduced, the peak value of the sawtooth voltage on the cathode of VI becomes smaller than the respective D.C. voltages obtained by rectifying the original sawtooth voltage. Both R.C. combinations will therefore start to discharge, one, however, about ten times as fast as the other. In case of a slow reduction of the pulse duration, the R.C. time of the first detection system plays no part and the aforementioned situation will be maintained.

In case of a faster decrease, however, of the pulse duration, the grid potential of the left triode of V3 will change more rapidly in a positive sense than the grid potential of the right triode of V3. The left triode will thus at a given moment, start to be slightly conductive and at the moment in which the closed-loop gain of the two triode sections together, with the capacitor C5, has attained the value 1, the state will change and the left section will become entirely conductive and the right section will be cut off. The anode voltage of the right section becomes then high which results in that the grid potential of V5 becomes slightly positive so that V5 becomes conductive and discharges very fast the capacitors C1 and C2.

By means thereof is also achieved that the cathode potential of V2 is very quickly reduced to a small positive value. The capacitor C5 discharges comparatively fast so that after a rather short time, the right triode section of V3 again becomes conductive. When a loop gain equal to 1 is reached, the state will reverse again, whereby again the right triode section of V3 becomes fully conductive. As a result, the relative anode voltage becomes again low and consequently the grid potential of V5 turns sharply negative so that V5 is entirely cut off.

On the grid of V2, the DC voltage, which is equivalent to the new peak value of the sawtooth voltage on the cathode of V1 can immediately reach its full value, so that the new measuring value is again directly available.

This extra circuit has the advantage that also when the discharge time of the measuring system is great, a fast response to decreasing values of the magnitude to be measured can be obtained. Due to the triggered discharging device, this response is even faster than the response of the rectifier circuit with the smaller time of discharge against which it is compared.

It should be noted that while the illustrative circuit described hereinbefore, uses valves but those skilled in the art will appreciate that the invention and its advantages may also be realized with transistors or other suitable semiconductor devices.

What is claimed is:

1. A system for determining the variable time duration of a repetitive phenomenon having a pulsating character and variable repetition frequency occurring in the electrical system of a motor vehicle comprising:

means for receiving electrical pulses having a time duration representative of the duration of opening of the injection valves of an electronically controlled fuel injection system for a combustion engine, pulse converting and integrating means connected to the first-named means for converting said electrical pulses into sawtooth-shaped pulses having an amplitude which increases gradually from an initial value, the peak amplitude of said sawtooth-shaped pulses being representative of the duration of the injection valve opening being measured, circuit means connected to the output of said pulse converting and integrating means for measuring the peak amplitude value of said sawtooth-shaped pulses, said circuit means including a detection circuit for detecting and responding to the occurrence of a rapid decrease in the duration of the injection valve opening, indicating means connected to the output of said circuit means for indicating the duration of the injection valve opening as represented by the peak amplitude value of said sawtooth-shaped pulses, said detection circuit comprising diode means, an input capacitor and an output capacitor, and resistance means shunting said output capacitor, the voltage across said resistance means and output capacitor being representative of the peak value of the sawtooth-shaped pulses and therefore of the time duration of the electrical pulses being measured and wherein said detection circuit has an R.C. time constant such that, when the time duration of the pulses with the lowest repetition frequency is being measured, the indicating means provides a stable indication, and further comprising a second peak detecting detecting circuit having having an R.C. time constant which is considerably smaller than that of the first detection circuit, means for supplying said sawtooth-shaped pulses to the second detecting circuit at the same time said pulses are supplied to the first detection circuit, a voltage comparing circuit connected to compare the outputs of said first detection means and second detecting means, and means connected to said voltage comparing circuit which is energized when the output voltage of the second detecting circuit drops below that of the first detection circuit, minus a particular threshold value, to trigger a switching circuit for connecting a low impedance into parallel with the output resistance of the first detection circuit.

2. A device according to claim 1 wherein said voltage comparing circuit comprises a pair of active elements connected in a circuit in which a closed loop gain equal to unity can be obtained and having two control inputs to which the output voltages of the two detecting circuits are supplied, said voltage comparing circuit being arranged such that, when the value of the one output voltage becomes smaller than that of the other minus a certain threshold value, the circuit changes state very quickly and emits a control pulse to the active element connected across the output load of the first detection circuit to change it from its normally non-conducting state to a conductive state such that the voltage across said output load which is supplied to the comparing circuit decreases quickly to return the circuit to its initial state.

* * * * *